(12) United States Patent
Yannam et al.

(10) Patent No.: US 11,895,062 B2
(45) Date of Patent: Feb. 6, 2024

(54) INTERNAL CHATBOT UNIVERSE WITH A UNIVERSAL COMMUNICATION PROTOCOL

(71) Applicant: Bank of America Corporation, Charlotte, NC (US)

(72) Inventors: Ramakrishna R. Yannam, The Colony, TX (US); Priyank R. Shah, Plano, TX (US); Castigliana Cimpian, San Francisco, CA (US); Sushil Golani, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 343 days.

(21) Appl. No.: 17/363,574

(22) Filed: Jun. 30, 2021

(65) Prior Publication Data
US 2023/0006947 A1 Jan. 5, 2023

(51) Int. Cl.
*H04L 51/02* (2022.01)
*G06N 20/00* (2019.01)
*H04L 69/08* (2022.01)
*G06F 16/903* (2019.01)
*G06F 40/58* (2020.01)

(52) U.S. Cl.
CPC ............. *H04L 51/02* (2013.01); *G06N 20/00* (2019.01); *H04L 69/08* (2013.01); *G06F 16/903* (2019.01); *G06F 40/58* (2020.01)

(58) Field of Classification Search
CPC ................................ G06F 16/903; G06F 40/58
See application file for complete search history.

(56) References Cited

U.S. PATENT DOCUMENTS

2012/0041903 A1\* 2/2012 Beilby .................... H04L 51/02
706/11
2012/0245920 A1\* 9/2012 Wu .......................... G06F 40/58
704/E11.001

OTHER PUBLICATIONS

"The Leading Open API Middleware for Banking," https://www.openbankproject.com/ Retrieved on Jun. 14, 2021.
(Continued)

*Primary Examiner* — Feng-Tzer Tzeng
(74) *Attorney, Agent, or Firm* — Weiss & Arons LLP (57) ABSTRACT

A system for responding to external requests received at an internal bot network is provided. The system may include an internal bot network including a plurality of internal bots. The plurality of internal bots may interact with a plurality of external bots. The system may include a translation layer/barrier. Each bot included in the plurality of internal bots and the plurality of external bots may be resident on one or more hardware processors. Each external bot may communicate using its own unique set of external specifications. Each internal bot may communicate using a universal set of internal specifications and is prevented from communicating using a set of external specifications. The translation layer/barrier may intercept requests and responses between the plurality of internal bots and the plurality of external bots. The translation layer/barrier reformats intercepted requests and responses to correspond to the set of specifications specific to the receiving bot.

18 Claims, 7 Drawing Sheets

(56) References Cited

OTHER PUBLICATIONS

"Our Ecosystem: Over 11,000 Developers From More Than 160 Countries Use Open Bank Project," *Ecosystem—Open Bank Project*, Retrieved on Jun. 14, 2021.
Simon Redfern, "Rest API V1.2.1," https://github-wiki-see.page/m/OpenBankProject/OBP-API/wiki/REST-API-V1.2.1, Dec. 12, 2017.

\* cited by examiner

INTERNAL CHATBOT UNIVERSE WITH A UNIVERSAL COMMUNICATION PROTOCOL

FIELD OF TECHNOLOGY

Aspects of the disclosure relate to chatbots.

BACKGROUND OF THE DISCLOSURE

Chatbots are used to automate conversations and interact with humans through various communication platforms. Chatbots may be powered by pre-programmed responses, artificial intelligence and/or machine learning in order to answer questions with or without contacting a live human agent. As such, chatbots can be used in lieu of providing direct contact with a live human agent. Chatbots may simulate conversations with a human using text, text-to-speech or speech-to-speech.

Many entities maintain a single chatbot. The single chatbot may include information relating to a specific domain of intents. For example, the entity may relate to selling furniture. As such, the chatbot may be trained to respond to information requests relating to furniture.

However, there are some entities that maintain multiple chatbots. Such entities may include various departments. Each department may maintain its own chatbot. However, although multiple chatbots may exist at a single entity, each chatbot must be accessed separately. In legacy chatbot applications, there is typically no communication between or among chatbots.

It would be desirable for seamless communication between chatbots. It would be further desirable for the inter-chatbot communications to involve a universal protocol.

SUMMARY OF THE DISCLOSURE

Apparatus, methods and systems for responding to external requests received at an internal bot network is provided. Bots may be applications that are resident on hardware processors and interact with humans. Bots may be powered by pre-programmed responses, artificial intelligence and/or machine learning to simulate conversations with humans. Bots may reduce the time needed for human operators to interact with human callers.

The system may include an internal bot network. The internal bot network may include a plurality of internal bots. The internal bot network may communicate with a plurality of external bots. The system may include a translation layer/barrier. The translation layer/barrier may be located between the external bots and the internal bots. In some embodiments, the translation layer/barrier may surround the internal bots.

Each bot included in the plurality of internal bots may be resident on a hardware processor. Each bot included in the plurality of external bots may be resident on a hardware processor.

Each bot included in the plurality of external bots may communicate using a set of specifications specific to, and unique to, each external bot.

Each bot included in the plurality of internal bots may communicate using a set of universal internal bot network specifications. Each bot included in the plurality of internal bots may communicate with each other bot included in the plurality of internal bots using the set of universal internal bot network specifications. Requests and responses communicated between the plurality of internal bots may maintain an original format.

Each bot included in the plurality of internal bots may be prevented from communicating using the sets of specifications specific to bots included in the plurality of external bots. Each bot included in the plurality of internal bots may communicate with each other bot included in the plurality of internal bots independent of communication with the translation layer/barrier.

The translation layer/barrier may intercept requests between the plurality of internal bots and the plurality of external bots. The translation layer/barrier may reformat the intercepted requests to correspond to the set of specifications specific to the receiving bot. The translation layer/barrier may intercept responses between the plurality of internal bots and the plurality of external bots. The translation layer/barrier may reformat intercepted responses to correspond to the set of specifications specific to the receiving bot.

A first request may be transmitted from a first bot included in the plurality of external bots to a second bot included in the plurality of internal bots. Upon intercepting the first request, the translation layer/barrier may read the first request. The translation layer/barrier may then identify a set of specification specific to the bot from which the intercepted request was transmitted. The translation layer/barrier may store the set of specifications specific to the bot from which the intercepted request was transmitted.

The translation layer/barrier may reformat the first request to the set of universal bot network specifications. The translation layer/barrier may forward the first request to the second bot. The second bot may process the first request. The second bot may generate a first response. The first response may respond to the first request. The first response may be formatted to correspond to the set of universal bot network specifications.

The first response may be transmitted from the second bot to the first bot. Upon intercepting the first response, the translation layer/barrier may identify the bot included in the plurality of external bots to which the response is directed. The translation layer/barrier may then retrieve the stored set of specifications specific to the bot to which the response is directed. The translation layer/barrier may reformat the response using the retrieved set of specifications. The translation layer/barrier may forward to reformatted response to the first bot.

It should be appreciated that multiple iterations of requests and responses may be transmitted between bots internal to the network and bots external to the network. Each of the iterations may be intercepted by the translation layer/barrier. Also, both the bots internal to the network and the bots external to the network may transmit requests and/or responses.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for creating and maintaining a universe of chatbots that communicate using a universal protocol is provided.

Problem Statement

There are entities that maintain multiple chatbots and/or interact with vendor chatbots and/or chatbots external to the entity. Previously, each chatbot was accessed individually and interaction between chatbots was typically unavailable. Also, each legacy chatbot maintains its own communication protocol. As such, in the event that communication between bots was available, each chatbot would have to be trained with the communication protocol of the communicating chatbot, and each request would have to be reformatted by a receiving chatbot in order for the chatbot to properly understand a request and respond accordingly.

Therefore, communication between legacy chatbots was cumbersome. These faults, as well as additional faults, resulting from lack of communication ease between chatbots may limit the capabilities of chatbots.

Solution

As chatbots become more common in the commercial world, it would be desirable for the chatbots to be able to communicate with one another using a universal protocol. Such communication between chatbots may strengthen and increase the current capabilities of the chatbots. There may be solutions associated with creating a network of chatbots, creating a universal protocol with which the chatbots communicate with each other and ensuring that the network of chatbots conform to the universal protocol.

In one embodiment, entities that are conforming to a universal protocol may transmit a predetermined number of protocol criteria that are important to the entity. Examples of protocol components that may be important to an entity may include header data, body data, extensible markup language (XML) tags, the order that data is included in the header and/or the response, the structure of the header and/or the response and any other suitable protocol components.

The predetermined number of protocol components that are important to the entities conforming to the protocol may be transmitted to a collaborative agent. The collaborative agent may generate a protocol that complies with more than a predetermined number of components that are important to more than a predetermined number of entities. For example, entity A selects the following components as important: xml tag name means customer name, header includes customer name and body is written using JavaScript. Entity B selects the following components as important: xml tag name means intent name; header includes customer name and body is written using JavaScript. Entity C selects the following components as important: xml tag name means customer name; header includes intent name and body is written using C++. The collaborative agent may generate the following protocol for the entity group comprising of entities A, B and C: xml tag name means customer name, header includes customer name and intent name, and body is written using JavaScript. The selection of the above-mentioned components may comply with the majority of the requests received from entities A, B and C. Each of entities A, B and C may be required to change one or more components of their initial protocol in order to conform with the universal protocol.

Bots that attempt to transmit messages that do not conform with the universal protocol may receive error messages, and the messages may fail to be received at the suitable recipient. In one embodiment, a message that conforms to the universal protocol may include a digital signature that indicates its compliance. As such, messages that do not conform to the universal protocol may fail to be received at another bot because each bot may only receive digitally signed messages.

Apparatus, systems and methods for receiving requests from, and generating responses to, external bots is provided. The requests and responses may initiate at a bot internal to a bot network or at a bot external to a bot network. The bot network may be a network of applications that are resident on one or more hardware processors. The bots may automate conversations and interact with humans using text channels, text-to-speech channels and/or speech-to-speech channels. The bots may be powered by pre-programmed responses, artificial intelligence and/or machine learning. The bots may simulate conversations with humans.

The method may include initiating a request at an external bot. The request may be formatted to a set of specifications specific to the external bot.

The method may include transmitting the request from the external bot to an internal bot. The internal bot may be included in the internal bot network.

The method may include intercepting the request at a translation layer/barrier. The translation layer/barrier may be located between the external bot and the bot network. The translation layer/barrier may be used to enable communication between the bots included in the internal bot network and the bots external to the bot network.

The translation layer/barrier may reformat the request to correspond to a set of universal internal bot network specifications. The reformatted request may be transmitted from the translation layer/barrier to the internal bot.

The reformatted request may be received at the internal bot. The internal bot may not be apprised that the request was reformatted prior to being received at the internal bot.

The internal bot may process the request. The internal bot may generate a response to the reformatted request. The response may be formatted to correspond to the set of universal internal bot network specifications.

The internal bot may transmit the response to the external bot. The translation layer/barrier may intercept the response. The translation layer/barrier may reformat the response to match the set of specifications specific to the external bot. The translation layer/barrier may transmit the reformatted response to the external bot. The external bot may not be apprised that the response was reformatted by the translation layer/barrier. Therefore, in some embodiments, the translation layer/barrier may be known as a transparent layer.

In some embodiments, prior to transmitting a request from the translation layer/barrier to the internal bot, the translation layer/barrier may read the request. The translation layer/barrier may then identify the set of specifications specific to the external bot transmitting the request. The translation layer/barrier may then store the set of specifications specific to the external bot. The translation layer/ barrier may store the set of specifications at memory accessible to the translation layer/barrier.

In certain embodiments, upon intercepting a response at the translation layer/barrier, the translation layer/barrier may identify the external bot to which the response is directed. The translation layer/barrier may then retrieve the set of specifications specific to the external bot. The translation layer/barrier may reformat the response using the retrieved set of specifications specific to the external bot.

It should be appreciated that requests and responses between internal bots may execute independent of the translation layer/barrier. The requests initiated at internal bots may be formatted to a set of universal bot network specifications. The requests may be transmitted from a first internal bot to a second internal bot. The request may be consumable at the second internal bot because the second internal bot may be able to process requests formatted to the set of universal bot network specifications. The second internal bot may generate a response. The response may be formatted to the set of universal internal bot network specifications. The response may be transmitted from the second internal bot to the first internal bot. The response may be received and processed at the first internal bot. The response may be consumable at the first internal bot because the first internal bot may be able to process responses formatted to the set of universal bot network specifications.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
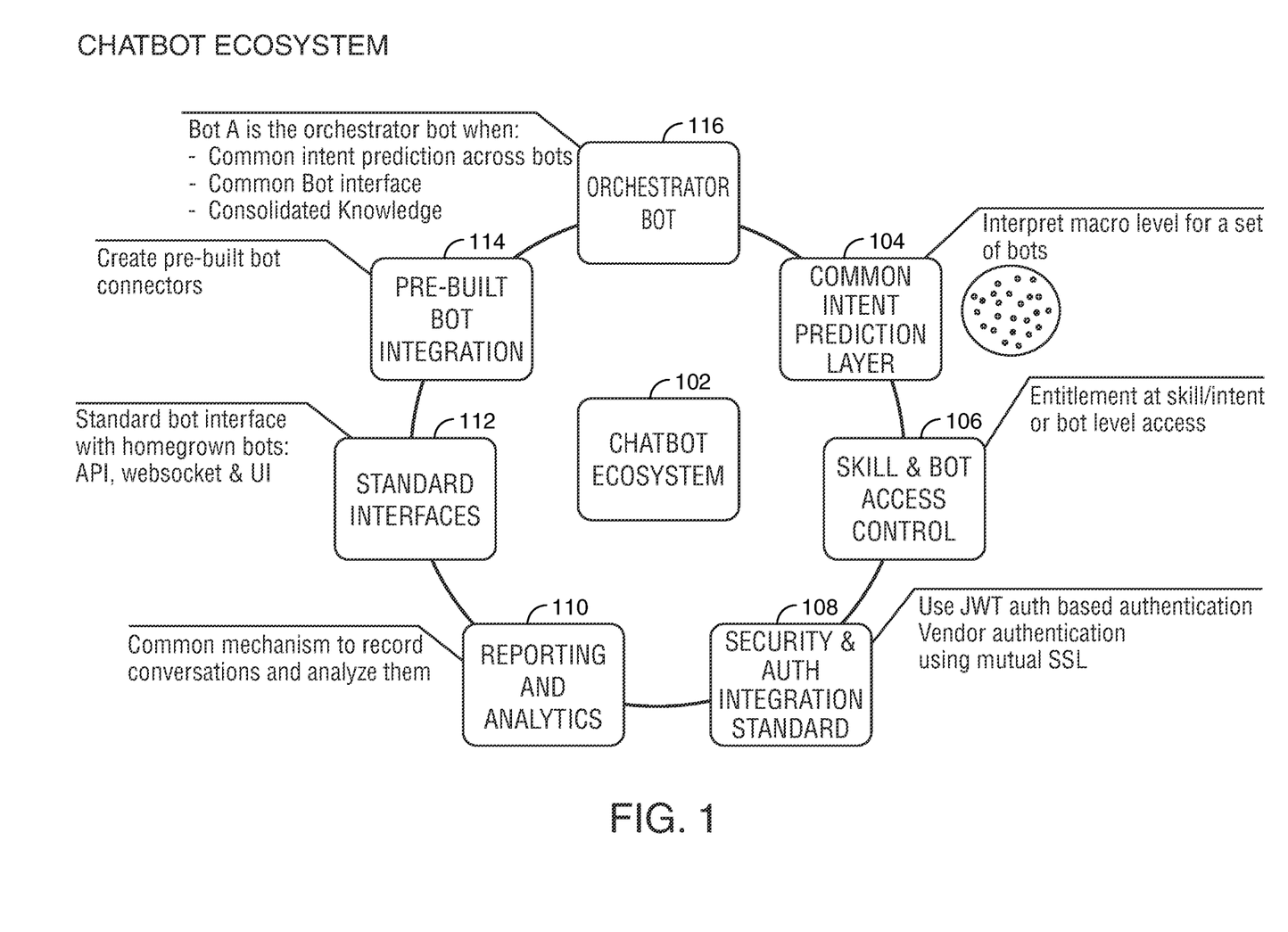
FIG. 1 shows an illustrative diagram in accordance with principles of the disclosure.

FIG. 1 shows a chatbot ecosystem. A chatbot ecosystem may be an ecosystem that includes various components of chatbots and how the chatbots operate together within a single ecosystem. The chatbot ecosystem may also collaborate and/or work together with chatbots that are external to the chatbot ecosystem. Such external chatbots may include vendor or third-party chatbots.

Container 102 shows a chatbot ecosystem. Various components of the chatbot ecosystem are shown surrounding container 102.

The components of the chatbot ecosystem may include an orchestrator bot, shown at 116. An orchestrator bot may be a bot that directs an incoming query to a domain-based bot. The domain of the domain-based bot may correspond to the domain of the incoming query.

In a training environment, the orchestrator bot may receive labeled training data. As such, the orchestrator bot may receive a query that has already been labeled with a domain.

In a production environment, the query may be received at the orchestrator bot with or without a labeled domain. In the event that the query is received labeled with a domain, the system may utilize machine learning and/or artificial intelligence to determine whether the domain with which the query was labeled is the correct domain. In the event that the query is received without a domain, machine learning and/or artificial intelligence at the orchestrator bot may determine a domain appropriate for the query.

In some embodiments, the orchestrator bot may be associated with a first domain and have limited knowledge of other domain bots. In such embodiments, the orchestrator bot may also be a domain bot, yet the orchestrator bot may have knowledge of other bots. In the event that a query is received at such an orchestrator bot, the orchestrator bot may answer the query when the query is associated with the same domain as the bot. In the event that a query is received at such an orchestrator bot, the orchestrator bot may also answer the query if the answer to the query is included within the limited knowledge of other bots included in the orchestrator bot. In the event that a query is received at such an orchestrator bot, the orchestrator bot may also retrieve knowledge from a bot associated with a different domain. In the event that a query is received at such an orchestrator bot, the orchestrator bot may channel the query to a different bot associated with a domain that is associated with the query.

A bot may be an orchestrator bot when the bot includes common intent prediction across bots. As such, a bot may be an orchestrator bot when each bot included in the ecosystem includes a common intent prediction layer. Common intent prediction layer may be the layer included in each bot that enables each bot to generate a prediction for a query. An orchestrator bot may be able to direct a query to the appropriate domain specific bot for intent prediction.

A bot may also be an orchestrator bot when the bot includes and/or has knowledge regarding a common bot interface. The common bot interface may enable a bot to interface with one or more other bots.

A bot may also be an orchestrator bot when the bot includes consolidated knowledge. Consolidated knowledge may include various small amounts of knowledge regarding other bots. As such, Bot A, which may know a universe of data regarding domain A, may include small amounts of knowledge regarding domain B, domain C and domain D.

The components of the chatbot ecosystem may include a common intent prediction layer, shown at 104. The common intent prediction layer may be a logic layer that interprets and determines the intent of a prediction. The common intent prediction layer may interpret macro level predictions for a set of bots. The common intent prediction layer may utilize one or more processes for predicting intents. Examples of such processes are included in co-pending, commonly owned patent application Ser. Nos. 17/243,728, 17/243,738 and 17/243,750, all of which are hereby incorporated by reference herein in their entirety.

The components of the chatbot ecosystem may include a skill and bot access control layer, shown at 106. The skill and bot access control layer may identify access for bot entitlements based on skill, intent or bot level.

The components of the chatbot ecosystem may also include a security and auth-integration standard, shown at 108. The security and auth-integration standard may include a layer of security and authorization required and executed prior to a user and/or bot accessing specific data. The security and auth-integration may be bot specific and/or user specific. As such, the security and authorization layer may allow users and/or bots to access appropriate data. However, the security and authorization layer may prevent users and/or bots from accessing data to which the users and/or bots are restricted from accessing.

For example, a user may have access to all of the data included in Bot A and have access to only a portion of the data included in Bot B. As such, the security and auth-integration layer may allow the user to access all of the data in Bot A, allow the user to access the portion of the data in included in Bot B to which the user has permission to access and prevent the user from accessing the portion of data included in Bot B to which the user is restricted from accessing. In another example, Bot A may have access to the data included in Bot B and have access to only a portion of the data included in Bot C. As such, the security and auth-integration layer may allow Bot A to access the data included in Bot B, allow Bot A to access the portion of data included in Bot C to which Bot A has permission to access and prevent Bot A from accessing the portion of data included in Bot C that Bot A is restricted from accessing.

At times, the permissions of bots and/or users may contradict. In some embodiments, the security and auth-integration layer may implement the most restrictive permissions. For example, Bot A may be allowed to access Bot B, however, an exemplary user X accessing Bot A may be restricted from accessing Bot B. As such, when user X is accessing Bot A, Bot A may be restricted from accessing Bot B. In other embodiments, the security and auth-integration layer may implement the least restrictive permissions. For example, Bot A may be allowed to access Bot B, however, user X accessing Bot A may be restricted from accessing Bot B. As such, when user X is accessing Bot A, user X may be allowed to access Bot B.

The security and auth-integration standard may utilize JavaScript Object Notation (JSON) Web Token (JWT) to implement these security standards. The security standards may be an enterprise application programming interface (API) management solution-enabled vendor authentication. The enterprise API management solution may include a centralized API catalog, centralized API management, centralized API standards and centralized API policies. The security standards may utilize a mutual secure sockets layer (SSL). An SSL may be a computing protocol that utilizes encryption to secure data transmitted over a network, such as the Internet.

The components of the chatbot ecosystem may also include a reporting and analytics layer, shown at 110. The reporting and analytics layer may include one or more mechanisms for recording conversations and analyzing the recorded conversations.

The components of the chatbot ecosystem may also include a standard interfaces layer, shown at 112. The standard interfaces layer may create a standard or universal language for bot-to-bot communications. As such, the application programming interfaces (APIs), WebSockets and user interfaces may follow a predetermined protocol. Therefore, the communications between bots are seamless and preferably remove a translation layer between bots. It should be appreciated that standard interfaces layer 112 may also include a translation layer/barrier, which is discussed in further detail below in connection with FIG. 4. The translation layer/barrier may translate requests originating from bots external to an internal bot network. The translation layer/barrier may also translate responses originating from bots internal to the internal bot network and being transmitted to bots external to the internal bot network.

The components of the chatbot ecosystem may also include pre-built bot integration, shown at 114. Pre-built bot connectors may be connectors that connect bots. The pre-built bot connectors may be instrumental in implementing a standard interfaces layer. Pre-built bot connectors may provide a conversion layer between the bots within a bot network.

Figure 2:
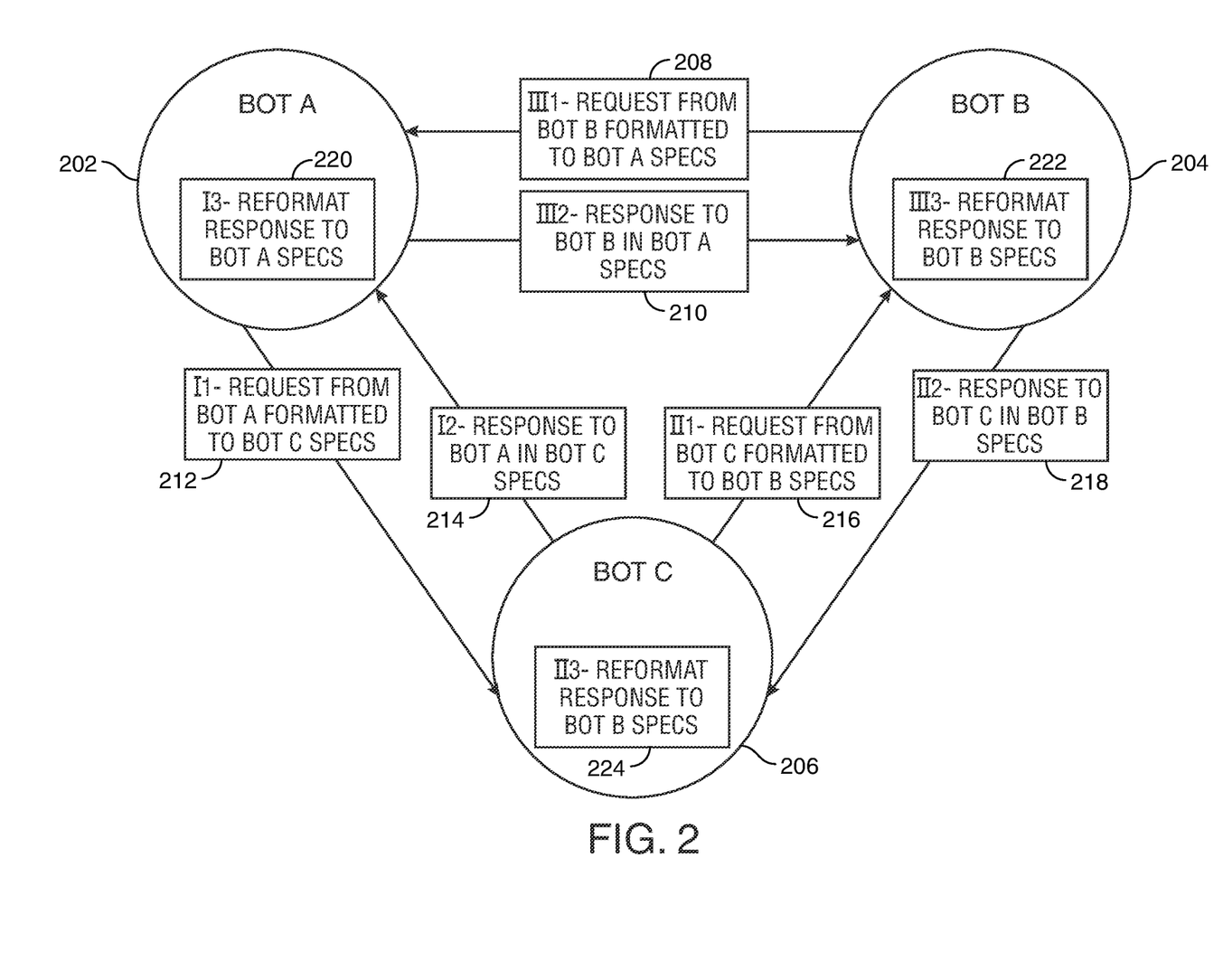
FIG. 2 shows another illustrative diagram in accordance with principles of the disclosure.

FIG. 2 shows an illustrative diagram. As shown in FIG. 2, each of bots A, B and C, shown at 202, 204 and 206 may communicate in its own language. For example, Bot A may communicate using Bot A specifications, Bot B may communicate using Bot B specifications and Bot C may communicate using Bot C specifications.

Bot A, shown at 202, may transmit a request to Bot C, as shown at 212. The request may be formatted to Bot C specifications. As such, Bot A may be required to know and maintain the specifications associated with Bot C communications in order to communicate with Bot C. Bot C may generate a response to the communication request received from Bot A. The response may be formatted in Bot C specifications. The response may be transmitted to Bot A, as shown at 214. Bot A may receive the response from Bot C. Prior to consuming the response, Bot A may be required to reformat the response to Bot A specifications, as shown at 220, in order for Bot A to be able to interpret the response.

Bot C, shown at 206, may transmit a request to Bot B, as shown at 216. The request may be formatted to Bot B specifications. As such, Bot C may have been required to know and maintain the specification associated with Bot B in order to communicate with Bot B. Bot B may generate a response to the communication request received from Bot C. The response may be formatted in Bot B specifications. The response may be transmitted to Bot C, as shown at 218. Bot C may receive the response from Bot B. Prior to consuming the response, Bot C may be required to reformat the response to Bot C specifications, as shown at 224, in order for Bot C to be able to interpret the response.

Bot B, shown at 204, may transmit a request to Bot A, as shown at 208. The request may be formatted to Bot A specifications. As such, Bot B may have been required to know and maintain the specification associated with Bot A in order to communicate with Bot A. Bot A may generate a response to the communication request received from Bot B. The response may be formatted in Bot A specifications. The response may be transmitted to Bot B, as shown at 210. Bot B may receive the response from Bot A. Prior to consuming the response, Bot B may be required to reformat the response to Bot B specifications, as shown at 222, in order for Bot B to be able to interpret the response.

Figure 3:
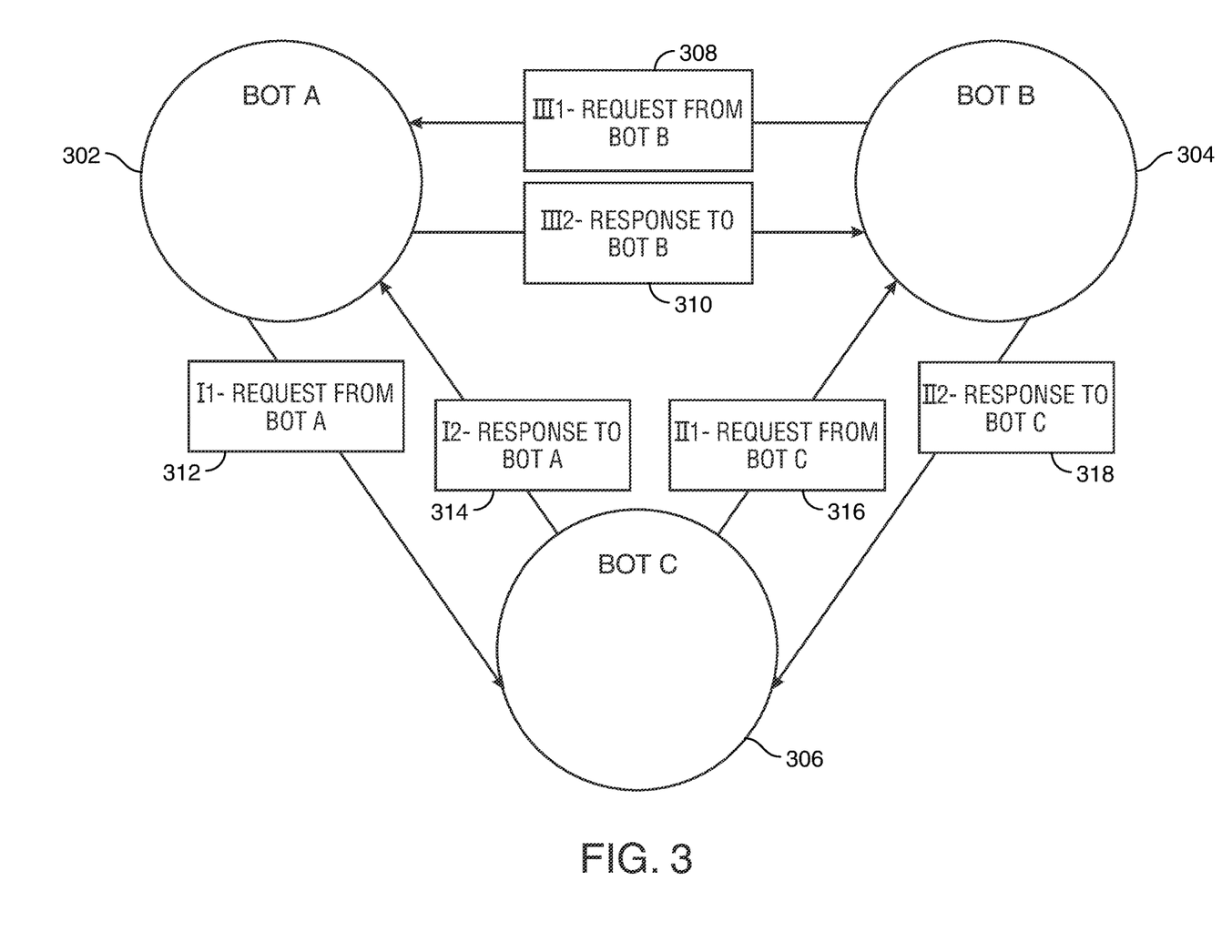
FIG. 3 shows yet another illustrative diagram in accordance with principles of the disclosure.

FIG. 3 shows an illustrative diagram. Bots A, B and C, shown at 302, 304 and 306, may communicate using a universal protocol. Because the communications between bots may follow a predetermined universal protocol, requests and responses to those requests may be seamlessly transmitted between bots without the requirement for translation or reformatting.

Bot A may transmit a request to bot C, as shown at 312. Bot C may respond to the request, as shown at 314. Bot C may transmit a request to Bot B, as shown at 316. Bot B may respond to the request, as shown at 318. Bot B may transmit a request to Bot A, as shown at 308. Bot A may respond to the request, as shown at 310. It should be appreciated that the communications between the bots may conform to the predetermined universal protocol.

Figure 4:
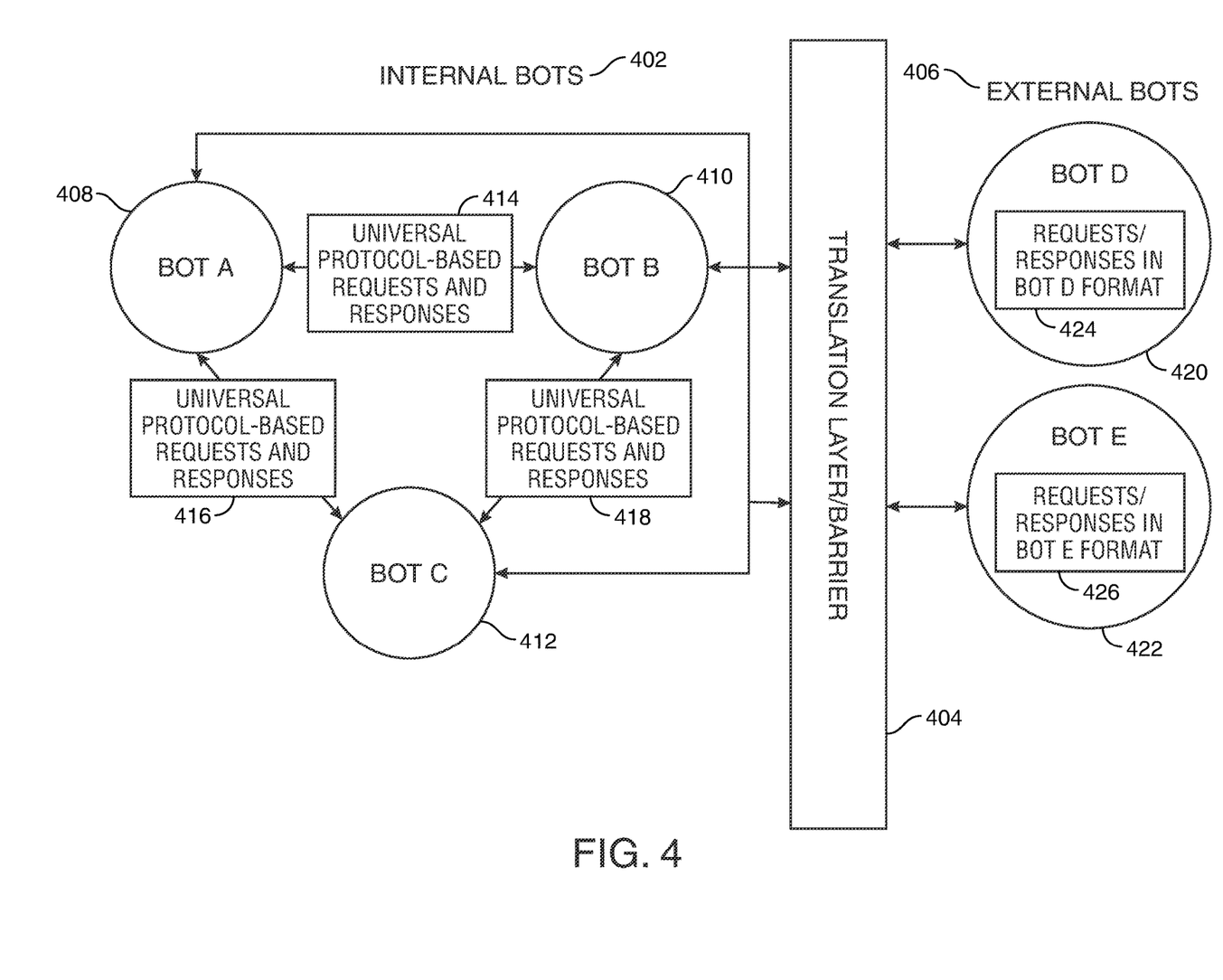
FIG. 4 shows still another illustrative diagram in accordance with principles of the disclosure.

FIG. 4 shows an illustrative diagram. The illustrative diagram shows internal bots, shown at 402 and external bots, shown at 406. The diagram also shows a translation layer/barrier 404. The translation layer/barrier may be located between internal bots 402 and external bots 406.

Internal bots 402 may include Bot A, shown at 408, Bot B, shown at 410 and Bot C, shown at 412. Bot A may communicate with Bots B and C using universal protocol-based requests and responses, as shown at 414 and 416. Bot B may communicate with Bots A and C using universal protocol-based requests and responses, as shown at 414 and 418. Bot C may communicate with Bots A and B using universal protocol-based requests and responses, as shown at 416 and 418.

External bots 406 may include Bot D, shown at 420 and Bot E, shown at 422. It should be appreciated that Bot D may generate requests and responses in a format unique to Bot D, as shown at 424. Bot E may also generate requests and response in a format unique to Bot E, as shown at 426.

At times, a first bot may communicate with a second bot. The first bot may comply with a universal protocol. However, the second bot may not comply with the universal protocol. Such instances may occur when the second bot is a vendor bot, or the second bot is under different auspices than the first bot. As such, the first bot may need to communicate with second bot, however, the first bot and the second bot may communicate using a different communication protocol.

In instances where internal bots 402 and external bots 406 communicate using different communication protocols, translation layer/barrier 404 may be situated in between internal bots 402 and external bots 406. Translation layer/barrier 404 may intercept communications between internal bots 402 and external bots 406. Translation layer/barrier 404 may translate the requests and responses into a language that is consumable by the receiving bot. As such, translation layer/barrier 404 may remove the onus from a receiving bot to ensure that a request or response follows an expected protocol. Also, translation layer/barrier 404 removes the onus from a transmitting bot to ensure that a request or response follows the protocol of the bot receiving the request or response.

Figure 5:
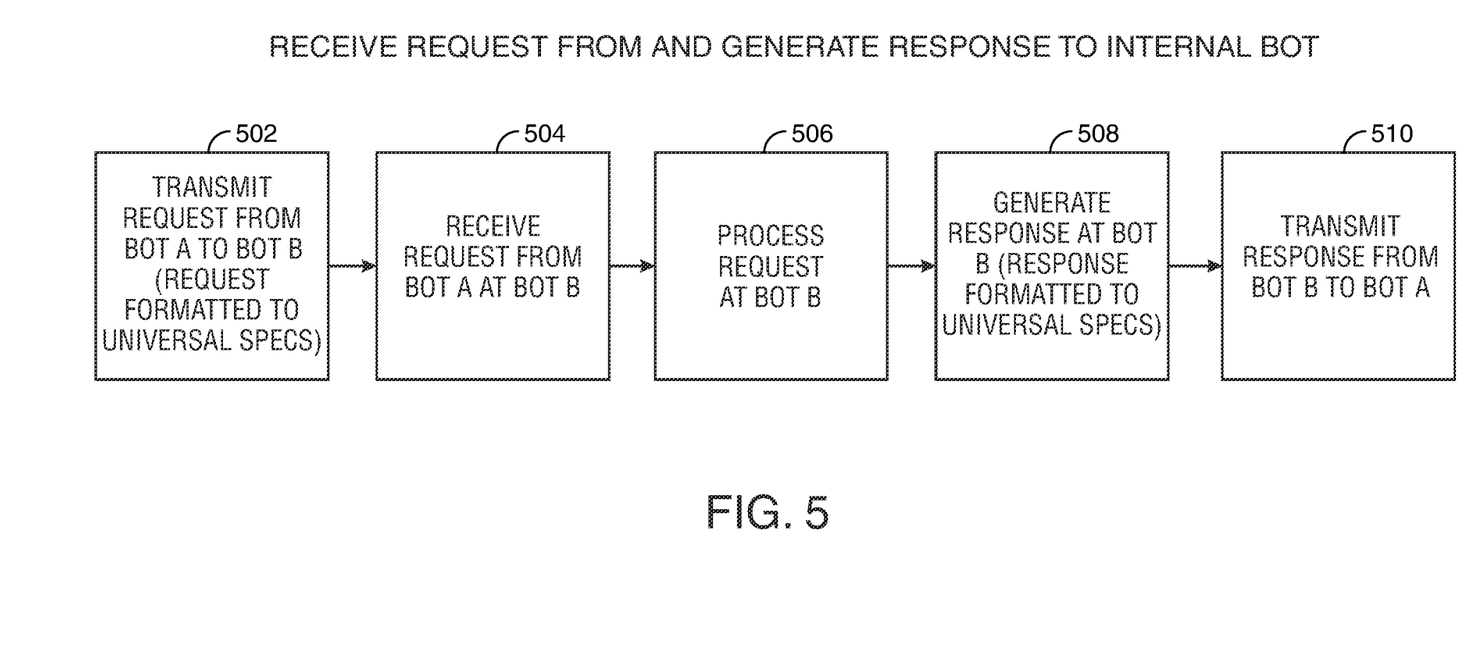
FIG. 5 shows an illustrative flow chart in accordance with principles of the disclosure.

FIG. 5 shows an illustrative flow chart. The flow chart shows receiving requests from, and generating responses to, an internal bot. Step 502 shows transmission of a request from Bot A to Bot B. The request may be formatted to universal specifications.

Step 504 shows that Bot B may receive the request from Bot A. Step 506 shows that the request may be processed at Bot B.

Step 508 shows that Bot B may generate a response. The response may be formatted to universal specifications. Step 510 shows transmission of the response from Bot B to Bot A.

It should be appreciated that translation or reformatting is not required because the internal bots all communicate using a universal protocol.

Figure 6:
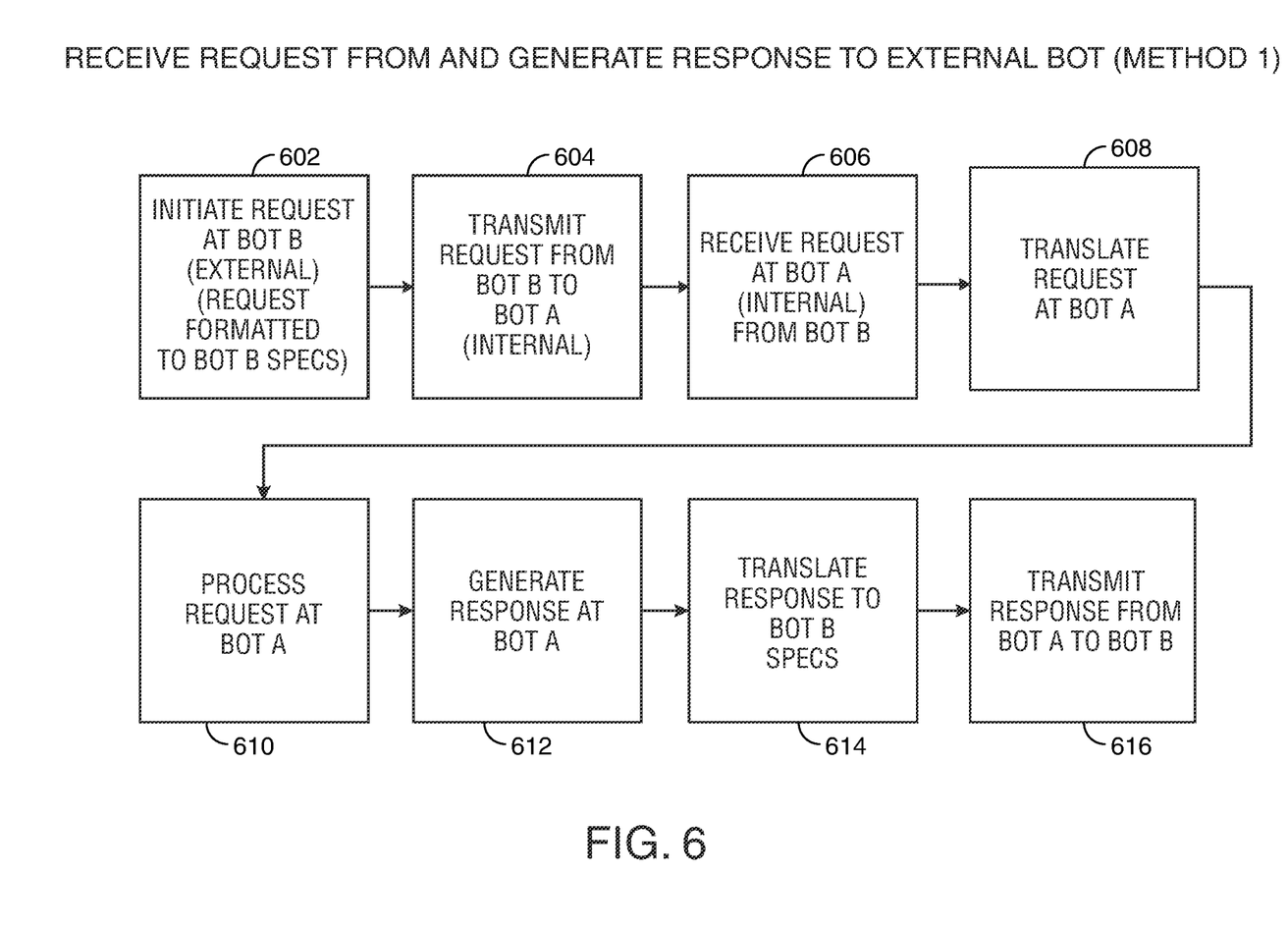
FIG. 6 shows another illustrative flow chart in accordance with principles of the disclosure.

FIG. 6 shows an illustrative flow chart. The flow chart shows receiving requests from, and generating responses to, an external bot. It should be appreciated that the flow chart shown in FIG. 6 shows an example of communication between an external bot and an internal bot without a translation layer. As such, the internal bot (and/or the external bot) may be informed regarding the communication protocol of the communicating bot.

Step 602 shows initiation of a request at Bot B. Bot B may be an external bot. The request may be formatted to Bot B specifications.

Step 604 shows transmission of the request from Bot B to Bot A. Bot A may be an internal bot. Step 606 shows receipt of the request at Bot A.

Step 608 shows translation of the request at Bot A. Step 610 shows processing the request at Bot A. Step 612 shows generating a response to the requests at Bot A.

Step 614 shows translating the response to Bot B specifications. Step 616 shows transmitting a response from Bot A to Bot B.

Figure 7:
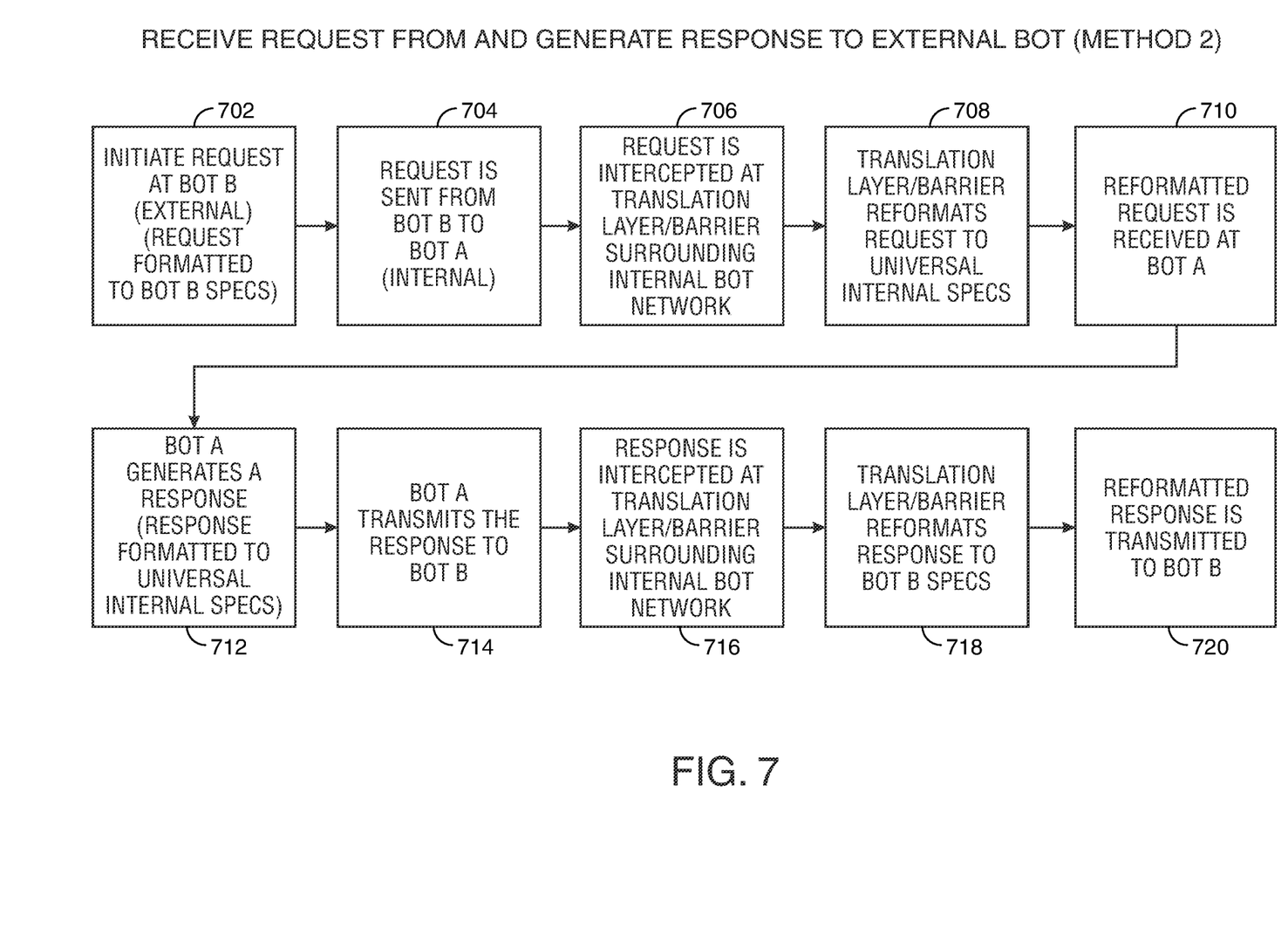
FIG. 7 shows yet another illustrative flow chart in accordance with principles of the disclosure.

FIG. 7 shows an illustrative flow chart. The flow chart shows receiving requests from, and generating responses to, external bots. It should be appreciated that the flow chart shown in FIG. 7 includes a translation layer/barrier between internal bots and external bots. As such, the internal bots and the external bots need not be informed regarding the communication protocol of the communicating bot.

Step 702 shows initiating a request at Bot B. Bot B may be an external bot. The request may be formatted to Bot B specifications.

Step 704 shows the request is sent from Bot B to Bot A. Bot A may be an internal bot.

Step 706 shows that the request is intercepted at a translation layer/barrier. The translation layer/barrier may surround the internal bot network.

Step 708 shows that the translation layer/barrier reformats the request to universal internal specifications. Step 710 shows that the reformatted request is received at Bot A.

Step 712 shows bot A generates a response. The response may be formatted to the universal internal specifications.

Step 714 shows that Bot A transmits the response to Bot B. Step 716 shows that the response is intercepted at the translation/layer barrier. The translation layer/barrier may surround the internal bot network. The translation layer/barrier may be located between external bots and the internal bot network.

Step 718 shows that the translation layer/barrier reformats the response to Bot B specifications. Step 720 shows that the reformatted response is transmitted to Bot B.

Thus, an internal chatbot universe with a universal communication protocol is provided. Persons skilled in the art will appreciate that the present invention can be practiced by other than the described embodiments, which are presented for purposes of illustration rather than of limitation. The present invention is limited only by the claims that follow.

What is claimed is:

1. A method for receiving a request from, and generating a response to, an external bot, said external bot being external to a bot network, said bot network being a network of applications that are resident on hardware processors that automate conversations and interact with humans, said network of applications being powered by pre-programmed responses, artificial intelligence and/or machine learning to simulate conversations with humans, the method comprising:

initiating the request at the external bot, the request being formatted to a set of specifications specific to the external bot;

transmitting the request from the external bot to an internal bot, said internal bot included in the bot network;

intercepting the request at a translation layer/barrier located between the external bot and the bot network;

reformatting, at the translation layer/barrier, the request to correspond to a set of universal internal bot network specifications, the set of universal bot network specifications comprising:
   an extensible markup language ("XML") tag that indicates a customer name;
   a header that indicates the customer name and an intent name; and
   a body written using JavaScript;
transmitting the reformatted request from the translation layer/barrier to the internal bot;
receiving the reformatted request at the internal bot;
processing the reformatted request at the internal bot;
generating a response to the reformatted request at the internal bot, said response being formatted to correspond to the set of universal internal bot network specifications;
transmitting the response from the internal bot to the external bot;
intercepting the response at the translation layer/barrier located between the external bot and the bot network;
reformatting the response to match the set of specifications specific to the external bot at the translation layer/barrier; and
transmitting the reformatted response from the translation layer/barrier to the external bot.

2. The method of claim 1, further comprising, prior to transmitting the request from the translation layer/barrier to the internal bot:
   reading the request at the translation layer/barrier;
   identifying the set of specifications specific to the external bot; and
   storing the set of specifications specific to the external bot at the translation layer/barrier.

3. The method of claim 2, further comprising, upon intercepting the response at the translation layer/barrier:
   identifying the external bot;
   retrieving the set of specifications specific to the external bot; and
   reformatting the response using the retrieved set of specifications specific to the external bot.

4. The method of claim 1, wherein the request is a first request, the response is a first response, and the internal bot is a first internal bot, the method further comprising:
   initiating a second request at a second internal bot, said second request being formatted to correspond to the set of universal internal bot network specifications;
   transmitting the second request from the second internal bot to the first internal bot;
   processing the second request at the first internal bot; and
   generating a second response at the first internal bot, said second response being formatted to correspond to the set of universal internal bot network specifications;
   transmitting the second response from the first internal bot to the second internal bot; and
   receiving the second response at the second internal bot.

5. The method of claim 4, wherein communication between the first internal bot and the second internal bot is independent of communication with the translation layer/barrier.

6. The method of claim 4, wherein each of the second request and the second response maintain an original format, said original format being the set of universal internal bot network specifications.

7. A system for responding to external requests received at an internal bot network, the system comprising:
   the internal bot network, said internal bot network comprising a plurality of internal bots, said internal bot network operable to communicate with a plurality of external bots; and
   a translation layer/barrier, said translation layer/barrier located between the external bots and the internal bot network;
wherein:
   each bot included in the plurality of internal bots and the plurality of external bots is resident on a hardware processor;
   each bot included in the plurality of external bots communicates using a set of specifications specific to, and unique to, each external bot;
   each bot included in the plurality of internal bots communicates using a set of universal internal bot network specifications and is prevented from communicating using the sets of specifications specific to bots included in the plurality of external bots, the set of universal internal bot network specifications comprising:
      an extensible markup language ("XML") tag that indicates a customer name;
      a header that indicates the customer name and an intent name; and
      a body written using JavaScript;
   the translation layer/barrier intercepts requests between the plurality of internal bots and the plurality of external bots;
   the translation layer/barrier reformats intercepted requests to correspond to the set of specifications specific to the receiving bot;
   the translation layer/barrier intercepts responses between the plurality of internal bots and the plurality of external bots; and
   the translation layer/barrier reformats intercepted responses to correspond to the set of specifications specific to the receiving bot.

8. The system of claim 7, wherein, upon intercepting a first request, said first request being transmitted from a bot included in the plurality of external bots to a bot included in the plurality of internal bots, the translation layer/barrier:
   reads the first request;
   identifies a set of specifications specific to the bot from which the intercepted request was transmitted; and
   stores the set of specifications specific to the bot from which the intercepted request was transmitted.

9. The system of claim 8, wherein, upon intercepting a first response, said first response being transmitted from the bot included in the plurality of internal bots to the bot included in the plurality of external bots, the translation layer/barrier:
   identifies the bot included in the plurality of external bots to which the response is directed;
   retrieves the stored set of specifications specific to the bot to which the response is directed; and
   reformats the response using the retrieved set of specifications.

10. The system of claim 8, wherein each bot in the plurality of internal bots communicates with each other bot included in the plurality of internal bots using the set of universal internal bot network specifications.

11. The system of claim 10, wherein each bot included in the plurality of internal bots communicates with each other bot included in the plurality of internal bots independent of communication with the translation layer/barrier.

12. The system of claim 7, wherein requests and responses communicated between the plurality of internal bots maintain an original format.

13. One or more non-transitory computer-readable media storing computer-executable instructions which, when executed by a processor on a computer system, perform a method for receiving a request from, and generating a response to, an external bot, said external bot being external to a bot network, the method comprising:
- initiating the request at the external bot, the request being formatted to a set of specifications specific to the external bot;
- transmitting the request from the external bot to an internal bot, said internal bot included in the bot network;
- intercepting the request at a translation layer/barrier located between the external bot and the bot network;
- reformatting the request to a set of universal internal bot network specifications at the translation layer/barrier, the set of universal bot network specifications comprising:
  - an extensible markup language ("XML") tag that indicates a customer name;
  - a header that indicates the customer name and an intent name; and
  - a body written using JavaScript;
- transmitting the reformatted request from the translation layer/barrier to the internal bot;
- receiving the reformatted request at the internal bot;
- generating a response to the reformatted request at the internal bot, said response being formatted to correspond to the set of universal internal bot network specifications;
- transmitting the response from the internal bot to the external bot;
- intercepting the response at the translation layer/barrier located between the external bot and the bot network;
- reformatting the response to match the set of specifications specific to the external bot at the translation layer/barrier; and
- transmitting the reformatted response from the translation layer/barrier to the external bot.

14. The computer-readable media of claim 13, the method further comprising, prior to transmitting the request from the translation layer/barrier to the internal bot:
- reading the request at the translation layer/barrier;
- identifying the set of specifications specific to the external bot; and
- storing the set of specifications specific to the external bot at the translation layer/barrier.

15. The computer-readable media of claim 14, the method further comprising, upon intercepting the response at the translation layer/barrier:
- identifying the external bot;
- retrieving the set of specifications specific to the external bot; and
- reformatting the response using the retrieved set of specifications specific to the external bot.

16. The computer-readable media of claim 13, wherein the request is a first request, the response is a first response, and the internal bot is a first internal bot, the method further comprising:
- initiating a second request at a second internal bot, said second request being formatted to correspond to the set of universal internal bot network specifications;
- transmitting the second request from the second internal bot the first internal bot;
- processing the second request at the first internal bot; and
- generating a second response at the first internal bot, said second response being formatted to correspond to the set of universal internal bot network specifications;
- transmitting the second response from the first internal bot the second internal bot; and
- receiving the second response at the second internal bot.

17. The computer-readable media of claim 16, wherein communication between the first internal bot and the second internal bot is independent of communication with the translation layer/barrier.

18. The computer-readable media of claim 16, wherein the second request and the second response maintain an original format, said original format being the set of universal internal bot network specifications.

* * * * *